United States Patent [19]
Blake

[11] Patent Number: 5,597,056
[45] Date of Patent: Jan. 28, 1997

[54] TORQUE CONTROLLED INFINITE RATIO FRICTION DRIVE HUB

[76] Inventor: William L. Blake, 631 SW. 6th St., JKV Villa 307, Pompano Beach, Fla. 33060

[21] Appl. No.: 366,733

[22] Filed: Dec. 30, 1994

[51] Int. Cl.⁶ .......................... B60K 41/26; F16H 15/18
[52] U.S. Cl. .......................... 192/6 A; 280/236; 301/6.5; 476/1; 476/50
[58] Field of Search .......................... 192/6 A; 280/236; 301/6.5; 475/193, 194; 476/50, 1; 74/337

[56] References Cited

U.S. PATENT DOCUMENTS

| | | | |
|---|---|---|---|
| 1,130,527 | 3/1915 | Martins . | |
| 2,424,873 | 7/1947 | Abbrecht | 74/191 |
| 2,886,986 | 5/1959 | Kopp | 74/796 |
| 3,274,859 | 9/1966 | Alsch | 74/796 |
| 3,420,114 | 1/1969 | Prestl | 74/191 |
| 3,420,122 | 1/1969 | Okabe | 74/796 |
| 4,738,164 | 4/1988 | Kaneyuki | 74/796 |
| 4,892,012 | 1/1990 | Kashihara | 74/772 |

FOREIGN PATENT DOCUMENTS

| | | | |
|---|---|---|---|
| 2-182593 | 7/1990 | Japan | 475/193 |
| 2-171394 | 7/1990 | Japan | 475/193 |
| 921613 | 3/1963 | United Kingdom | 476/50 |

*Primary Examiner*—Allan D. Herrmann
*Attorney, Agent, or Firm*—Alvin S. Blum

[57] ABSTRACT

Contained within a wheel hub housing is a variable ratio friction drive transmission. A chain drive input sprocket drives direction reversing spools arrayed around a central axis on shafts set at an angle to the central axis. A spool driven element rotates in the opposite direction. The spool driven element drives double cone elements on the shafts. A cone driven element then drives the wheel in the same direction as the input. The double cones are axially movable relative to the cone driving and driven elements. In a first axial position, for low torque, the driving element contacts a small diameter cone portion, and the driven element contacts a large diameter cone portion. As torque increases, the cones are moved by a cam mechanism so that the output ratio reverses and rapid input rotation produces high torque, slow output. A clutch and brake may be included.

19 Claims, 2 Drawing Sheets

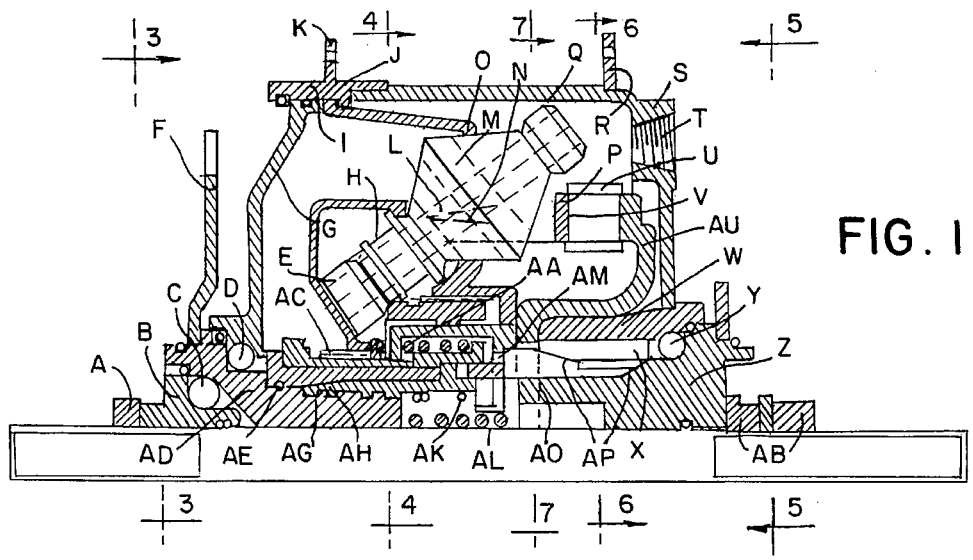
FIG. 1
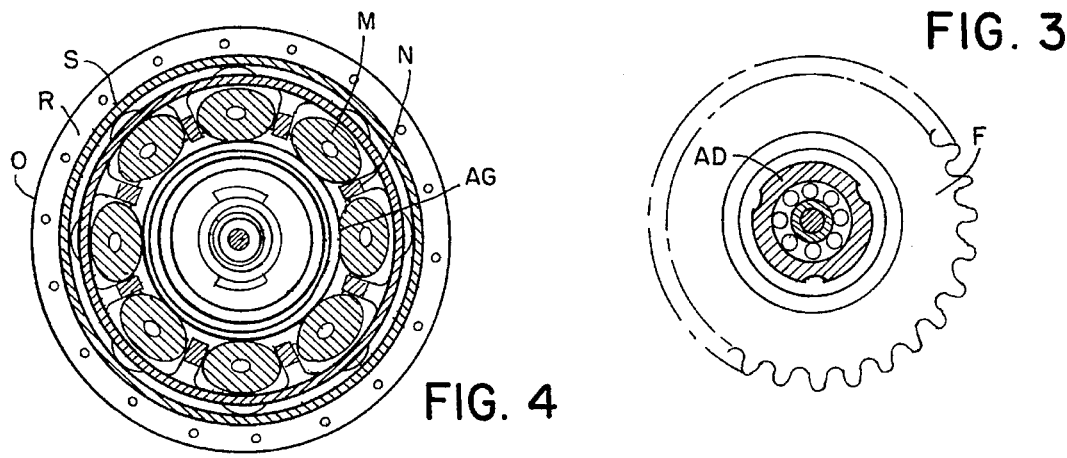
FIG. 3
FIG. 4
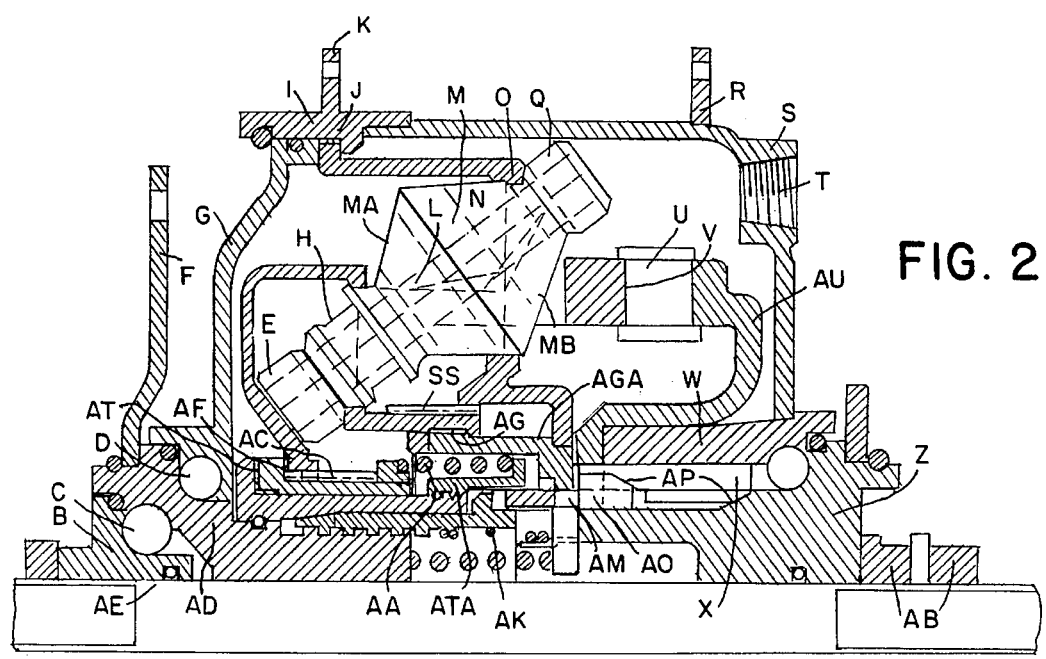
FIG. 2

TORQUE CONTROLLED INFINITE RATIO FRICTION DRIVE HUB

BACKGROUND OF THE INVENTION

The present invention relates to power transmission mechanisms, and more particularly to frictional drive systems providing a wide range of ratios of rotation between input and output in which the ratio is continuously variable and controlled by the applied input torque for bicycles, motorcycles, and the like.

In power transmission applications wherein it may be desirable to alter the drive ratio, especially in motorbikes and bicycle transmissions, it is common practice to employ a plurality of gears and gear shifting components which are costly and failure prone. For optimum efficiency, riders may prefer to apply a constant pedal force, whereas the terrain may require more or less energy to traverse, depending on grade. To achieve this goal of constant pedal force, the rider continuously shifts gears. In order to keep the incremental change between gears small, a greater number of gears is required and a greater number of shifting actions are required with energy loss at each shift. The rider is also distracted from the cycling effort by the manual shifting operation. Despite numerous efforts to overcome these deficiencies, the cycle industry is currently producing bicycles with few or many gears and the consumer is burdened with high maintenance costs, abrupt ratio changes and multiple shifting efforts.

SUMMARY OF THE INVENTION

It is accordingly an object of the invention to provide a transmission with continuously variable ratio selection over a broad range of ratios wherein the ratio is determined by pedal torque without requiring the operator to manually select ratios. The transmission includes a clutch coaster brake, thereby eliminating the awkward and unpredicable wheel rim brakes.

The variable speed transmission or variator of the invention employs the well known principles of friction cone drives. The cycle hub of the invention is surrounded by the wheel. It is driven conventionally, such as by a chain sprocket input. When going uphill, increased torque must be applied. To increase the output torque and reduce speed, the transmission automatically and continuously, i.e. not stepwise, reduces the output/input ratio of rotation rates as the input torque increases. The input, as it rotates, drives a group of double cones tangentially at a first cone. The output is driven by a tangential contact at each second cone. The double cones are axially movable continuously between two positions. In a first position, at low torque, the driving input contacts a small diameter area of the first cone and the output contacts a large diameter area of the second cone for a high output/input ratio. In the second, high torque, position, the input contacts a large diameter area of the first cone and the output contacts a small diameter area of the second cone. A spring bias urges the cones toward the first position. Input torque, through a cam mechanism, urges the cones toward the second position. When little force is required, such as downhill, the cones are at or near the first position and one rotation of the input may cause many rotations of the wheel. When going uphill, the increased torque moves the cones toward the second position against the bias until many input rotations result in few wheel rotations. This simple arrangement would result in the wheel rotating opposite to the input rotation. To overcome this situation, which is undesirable for an operator powered vehicle, the invention may optionally be provided with reversing spools in operative series with the double cones. Thereby, the input and output will rotate in the same direction. Each spool and double cone assembly is rotatably mounted on a separate shaft at an angle to the central axis. The shafts are mounted around the central axis on a shaft carrier which moves axially between the two positions. The output contact may be a cup spring to apply good frictional contact and to provide the spring bias toward the first position with the shaft angle ensuring increased friction and bias as torque increases.

The assembly may optionally include a clutch and a brake mechanism such as the type well known as a "coaster brake". The assembly may optionally include an adjustable ratio-limiting stop mechanism so that at very high torque the minimum output/input ratio is increased.

These and other objects, advantages and features of the invention will become apparent when the detailed description is considered in conjunction with the drawings.

BRIEF DESCRIPTION OF THE DRAWINGS

FIG. 1 is a sectional view through the upper half of a hub of the invention in the low torque mode of operation.

FIG. 2 is a sectional view through the upper half of a hub of the invention in the high torque mode of operation.

FIG. 3 is a cross sectional view taken through line 3—3 of FIG. 1.

FIG. 4 is a cross sectional view taken through line 4—4 of FIG. 1.

DETAILED DESCRIPTION OF PREFERRED EMBODIMENTS

Figure 5:
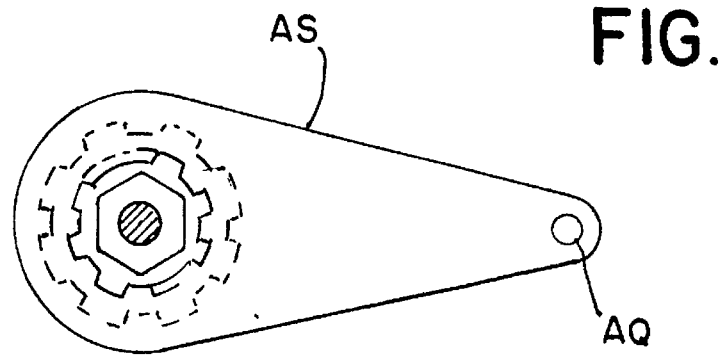
FIG. 5 is a cross sectional view taken through line 5—of FIG. 1.
Figure 6:
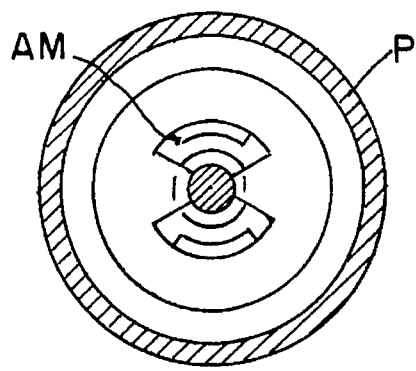
FIG. 6 is a cross sectional view taken through line 6—6 of FIG. 1.
Figure 7:
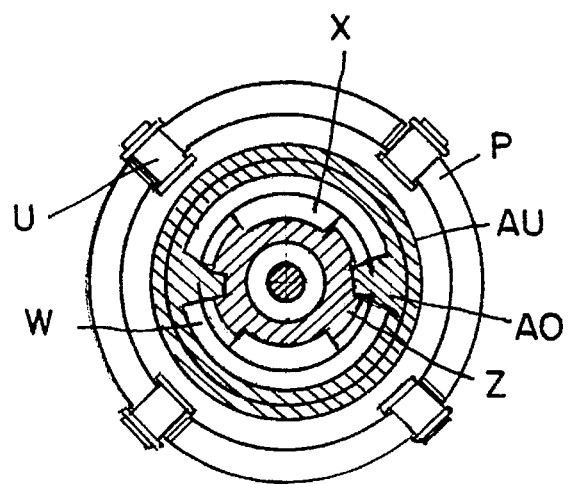
FIG. 7 is a cross sectional view taken through line 7—7 of FIG. 1.

The torque variator (transmission), in this unique bicycle version, replaces the contemporary bicycle derailleur and handbrake. It is in the form of a wheel hub providing a smooth (non-stepped) speed ratio variation between pedals and drive wheel and, in particular, is capable of handling up to 110 KG effort on a 15 CM pedal arm to as low as 30 KG at a bicycle speed of 67 KmPH. Although it could be otherwise, this version of the variator has a speed range equal to a 21 step derailleur and is automatic in a manner similar to a contemporary automotive transmission. It is responsive to pedal effort as well as wheel torque demand. An output proportional ratio sensor and, in addition, an input torque sensor, both within the hub, are provided to sense and to select the proper ratio for both wheel torque demand and for a widely varying rider pedal input effort. The unique heart of the variator is a variable, high efficiency, traction drive. A clutched coaster brake similar to that of a single speed bicycle is also incorporated within the hub thus eliminating the necessity of the contemporary unpredictable hand grip/wheel rim shoe brakes. In the mid clutch position, between forward drive and brake engagement, free wheeling (coasting) is permitted.

The hub assembly consists of six (6) principle component groups:

(1) the traction drive (2) the input clutch (3) the brake (4) the automatic shifter (5) the automatic shift limiter (6) the hub housing The Traction Drive Special attention has been given to the convex/concave and the convex/conical drive contacts and to the selection of extreme high Hertz pressure materials in this application. The variable drive consists of a series of double cones (M), in this case (8), together with (8) spools (H), each pair rotating freely on a fixed pin carrier shaft (L). The (8) shafts are arranged, equally spaced, in a conical pattern around the periphery of a shaft carrier or spider frame (N) which rotates about a first axis (AX) which is the wheel axis. Each shaft is anchored at each end in non-rotating bearings (E) & (Q) of the frame. Traction contacts at (I), (AE), (AG) & (O) at four points provide loading of the cones and spools as required to produce the necessary input, output and intermediate torque forces. When the spider is variably translated axially, as dictated by the variable torques at (I) and (O), the input contacts or spool driving elements or input cup springs (I) and the backup cup contacts or spool driven elements (AE) are guided to move with the input spools (H). The output contacts (cup springs) or cone driven elements (O) driven from second cones (MB) and backup contacts or cone driving elements (AG), driving first cones (MA), however, are fixed axially relative to the hub and do not move with the spider and cones, thus a cone diameter ratio change is affected as the spider is axially translated relative to the output cup. Note: the purpose of the spools (H), in the system is to maintain a unidirectional relationship between pedal and wheel rotation. The external input to this inhub torque/speed variator is a standard chain drive from the front pedal to the rear hub assembly and has, in this application, a one-to-one ratio. The input cup spring (I) is spline coupled to the input hub and sprocket assembly (F) & (AD) through a spring (AA) and cam assembly (AC) & (AT), comprised of cam (AT) and cam follower and spline (AC), the latter assembly being, with the automatic shifter, a unique component for the purpose of shift stop control of the shifter, as described under Automatic Shift Limiter. The input sprocket assembly or rotory driver (F) & input shaft (AD) is of usual design, rotating on a ball bearing (C) and carrying a ball bearing (D) to support the hub assembly. The spool backup contact (AE) and the cone backup contact (AG) constitute an intermediate transfer assembly in which the contacts are intercoupled by means of a second spline (SS) to allow for relative axial motion between the two contacts, as previously described. The output cup spring (O) is coupled by rigid toothed coupling directly to the bicycle wheel at output means (J). To complete the variator assembly is the second and principle unique control component referred to above, the Automatic Spider Shifter which produces the torque/speed ratio change of the variator. This axial shift is accomplished by means of the cam assembly (V) connected to the spider frame through the integral frame extension (P) on one side of the cam and to the bicycle frame through the flange piece (AU) on the other side. The cam assembly is responsive to pedal and wheel torque along with cone traction force as described under The Automatic Shifter.

The Input Clutch

This component of the variator is similar to a usual drive/coaster brake assembly of a standard single speed bicycle. It consists of an axially shifted screw clutch nut (AH) with conical friction surface designed to engage, in the forward pedalling direction, the input shaft (AD) and with it, through the input cam (AC) & (AT) of the Automatic Shift Limiter, the input cup (I) and, in the opposite back pedalling direction, to engage brake shoes (X) through a brake shoe extension piece (AM). In the midposition the clutch is disengaged and free wheeling (coasting) of the bicycle is permitted. A clutch spring (AK), yieldable as in the standard single speed bicycle, holds by friction, the clutch nut (AH) from rotating until engaged by either the drive friction cone or the brake clutch friction cone as the nut is screw shifted either way. Note: a second axial retainer spring (AI) concentric with and inside the clutch spring is provided to axially retain the various inline components of the shaft assembly (AL) & (AU).

The Brake

This component, similar to a standard single speed coaster brake, in this configuration, consists of (2) shoes (X) operating by friction force against a brake drum (W), an integral part of the housing (S). Brake shoes (X) are radially forced against the brake drum (W) by axial force from the clutch nut (AH) against a brake extension piece (AM) and thence translated into radial and torsional force by the wedge ramps (AP) at each end of the brake shoes (X)—see The Input Clutch. An anchor nut (Z) holds the brake shoes and the brake extension piece (AM) from rotating and thus provides the holding reaction to the wheel brake torque as well as providing hub support through ball bearing (Y). The connection of the anchor nut (Z) to the bicycle frame is an external splined arm (AS) anchored externally to the frame by means of a screw and U clip (AQ), as best seen in FIG. 5.

The Automatic Spider Shifter

This component along with the input shift limiter as described under The Automatic Shift Limiter are the essence of the originality of the Automatic Torque Variator. This automatic shifter incorporates (4) cam slopes (V) in working combination with (4) rollers (U) which together are capable, by torque forced rotation of the spider assembly, of producing axial motion of the spider assembly through the frame extension (P). Motivation for this axial cam motion is derived from a difference between tractive torque at (O) and tractive torque at (I) as counteracted by the axial component of the radial traction preloading force of the output cup spring on the inclined cone surfaces at (O). In operation, as magnitude of the torque sensed at (O) and (I) increases the spider assembly (N) is automatically shifted axially, from low torque position of FIG. 1 toward FIG. 2 position of the cams (V) against the cup spring component force at (O), as the spider rotates. The drive ratio is decreased and as a consequence the necessary effort required to be imposed by the rider is reduced. Input torque is, of course, lower when applied by a smaller person (e.g. by a small woman or child, say as low as 30 KG pedal effort rather than by a larger man, say as high as 110 KG pedal effort. The control compensation for this difference is provided, principally, by the shift limiter as described under The Automatic Shift Limiter, and in part, as a result of the input torque, proportional to rider pedal effort, being opposite (subtracted from) the output wheel demand torque. To anchor the cam assembly radially, torsional reaction forces are transmitted to the nonrotating anchor nut (Z) (see The Brake) by means of (2) fingers (AO) of the cam seat (AU) which are arranged to engage (2) axial end slots of the anchor nut (Z) at (AO).

The automatic Shift Limiter

This subassembly of the traction drive permits a proportional axial travel of the automatic shifter ranging from a full ratio automatic shift for the 30 KG pedal effort to a lower ratio automatic shift for a 110 KG pedal effort. The shift limiter consists of a (2) jaw cam slope pair (AC) & (AT)

between the input sprocket (F) & (AD) and the input cup (I)/spline assembly (AC). An axial spring (AA) provides the necessary loading to proportionally react to the range of pedal effort; i.e., 30 KG to 110 KG. The effect of the automatic shift limiter is to vary the location of the shifter travel stop (AF) of (AC) in proportion to input pedal effort thus to limit the extent of automatic shift travel of the spider frame (N) accordingly. As torque increases beyond a preset limit, torque applied to cam assembly (AC) (AT) overcomes spring (AA) and stop (AF) slides to the right, limiting the leftward movement of the shaft carrier (N) so that the minimum ratio is limited to a higher value and the output is speeded up.

The spring (AA) is located between concentrically positioned extension (ATA) of cam assembly (AT) and extension (AGA) of cone driving element (AG). The elements designated by the reference characters (ATA), (AT) (AH) between springs (AA) and (AK).

The Hub Housing

The hub housing with face cover (G) permits assembly and closure from the drive end of the hub. A plug (T) for fill and drain of the traction fluid is provided at the brake end of the hub. The tie rod (AJ) on which the anchor nut (Z) is supported is fitted with threaded locknuts (AB) at the brake end for axial positioning and extends through to the drive end where it has threaded to it an input nut (B) and is also fitted with a locknut (A). The input nut (B) carries the ball bearing (C) upon which the input sprocket assembly (F) & (AD) rotate. Flanges (K) & (R) are each adapted as usual at the outer periphery of the hub for (18) spoke attachments. Also provided in the hub assembly are the necessary O-ring type oil and dirt seals and the necessary ring type retainers for sprocket, cover, etc.

When the device of the invention is to be used on an engine driven vehicle such as a motorscooter, there is no need to have the input rotation and output rotation in the same direction. In that case the device may be made without the spool mechanism for reversing rotation.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A hub with a continuously variable transmission ratio between input and output rotation rates for a wheel on a cycle frame, the hub comprising:

(A) an input shaft rotating about a first axis with a rotary driver connected thereto;

(B) an output means for connection to a wheel for rotation thereof, said output means coaxial with said input shaft;

(C) a shaft carrier rotatable about said first axis and arranged to move axially between a first axial position and a second axial position;

(D) a plurality of carrier shafts attached to said shaft carrier, each shaft being inclined at a common angle to said first axis;

(E) a plurality of spool members with a spool member mounted freely rotatable upon each carrier shaft;

(F) a plurality of double cone elements, including a first cone and a second cone joined together, with one double cone element mounted freely rotatable upon each carrier shaft;

(G) a spool driving element rotatably coupled to said input shaft and arranged to move axially with said shaft carrier, said spool driving element having a running surface rotatably driving all of said spool members simultaneously;

(H) a spool driven element arranged to rotate about said first axis and to move axially with said shaft carrier, and having a running surface rotatably driven by all of said spool members simultaneously to thereby rotate said spool driven element in a direction opposite to said input shaft;

(I) a cone driving element rotatably coupled to said spool driven element and axially unmovable, said cone driving element having a running surface tangentially contacting, and rotatably driving, a first cone of all of said double cone elements simultaneously;

(J) a cone driven element rotatably coupled to said output means and axially unmovable, said cone driven element having a running surface tangentially contacting, and rotatably driven by, a second cone of all of said double cone elements simultaneously to thereby rotate said output means in a direction opposite to said cone driving element and the same as said input shaft;

(K) spring bias means for urging said shaft carrier axially toward said first axial position;

(L) a non-rotating assembly arranged for connection to a cycle frame;

(M) cam means operatively connected between said non-rotating assembly and said shaft carrier for urging said shaft carrier axially toward said second axial position when said shaft carrier is rotated in the same direction as said output means for forward motion of said frame;

(N) wherein increased input shaft torque for forward motion causes said shaft carrier to rotate and said cam means to move said shaft carrier toward said second axial position in which said cone driving element contacts a larger diameter portion of said first cone and said cone driven element contacts a smaller diameter portion of said second cone to thereby reduce the output/input ratio as input torque is increased.

2. The hub according to claim 1, further comprising a housing means for enclosing said spool members, said double cone elements, said shaft carrier, and elements associated therewith and for containing a lubricant composition therein.

3. The hub according to claim 2, in which said cone driven element comprises said spring bias means at least in part.

4. The hub according to claim 3, further comprising clutch means interposed between said input shaft and said spool driving element, and operatively connected to said input shaft, for engaging said spool driving element when input torque for a forward direction is applied to said input shaft and for disengaging said driving element for a free wheeling operative mode when input torque for a forward direction is not applied to said input shaft.

5. The hub according to claim 4, further comprising brake means interposed between said output means and said non-rotating assembly, and operatively connected to said input shaft, for resisting output means rotation when said input shaft is rotated in a reverse direction.

6. The hub according to claim 5, in which said spool driven element and said spool driving element are diametrally opposed on each spool member and said cone driving element and said cone driven element are diametrally opposed on each double cone element.

7. The hub according to claim 6, in which said second cone is arranged so as to apply increasing contact force against said cone driven element as said shaft carrier moves toward said second axial position.

8. The hub according to claim 1, in which said second cone is arranged so as to apply force against said cone driven element as said shaft carrier moves toward said second axial position.

9. The hub according to claim 1, further comprising an adjustable stop means for limiting the minimum output/input ratio of said hub, said stop means being adjustable by the input torque applied above a predetermined amount.

10. The hub according to claim 9, further comprising a housing means for enclosing said spool members, said double cone elements, said shaft carrier, and elements associated therewith and for containing a lubricant composition therein.

11. The hub according to claim 10, in which said cone driven element comprises said spring bias means at least in part.

12. The hub according to claim 11, further comprising clutch means interposed between said input shaft and said spool driving element, and operatively connected to said input shaft, for engaging said spool driving element when input torque for a forward direction is applied to said input shaft and for disengaging said driving element for a free wheeling operative mode when input torque for a forward direction is not applied to said input shaft.

13. The hub according to claim 12, further comprising brake means interposed between said output means and said non-rotating assembly, and operatively connected to said input shaft, for resisting output means rotation when said input shaft is rotated in a reverse direction.

14. The hub according to claim 13, in which said spool driven element and said spool driving element are diametrally opposed on each spool member and said cone driving element and said cone driven element are diametrally opposed on each double cone element.

15. The hub according to claim 14, in which said second cone is arranged so as to apply increasing contact force against said cone driven element as said shaft carrier moves toward said second axial position.

16. A hub with a continuously variable transmission ratio between input and output rotation rates for a wheel on a cycle frame, the hub comprising:

(A) an input shaft rotating about a first axis with a rotary driver connected thereto;

(B) an output means for connection to a wheel for rotation thereof, said output means coaxial with said input shaft;

(C) a shaft carrier rotatable about said first axis and arranged to move axially between a first axial position and a second axial position;

(D) a plurality of carrier shafts attached to said shaft carrier, each shaft being inclined at a common angle to said first axis;

(E) a plurality of double cone elements, including a first cone and a second cone joined together, with one double cone element mounted freely rotatable upon each carrier shaft;

(F) a cone driving element rotatably coupled to said input shaft and axially unmovable, said cone driving element having a running surface tangentially contacting, and rotatably driving, a first cone of all of said double cone elements simultaneously;

(G) a cone driven element rotatably coupled to said output means and axially unmovable, said cone driven element having a running surface tangentially contacting, and rotatably driven by, a second cone of all of said double cone elements simultaneously;

(H) spring bias means for urging said shaft carrier axially toward said first axial position;

(I) a non-rotating assembly arranged for connection to a cycle frame;

(J) cam means operatively connected between said non-rotating assembly and said shaft carrier for urging said shaft carrier toward said second axial position when said shaft carrier is rotated in the same direction as said output means for forward motion of said frame;

(K) wherein increased input shaft torque for forward motion causes said shaft carrier to rotate and said cam means to move said shaft carrier toward said second axial position in which said cone driving element contacts a larger diameter portion of said first cone and said cone driven element contacts a smaller diameter portion of said second cone to thereby reduce the out/input ratio as input torque is increased.

17. The hub according to claim 16, further comprising a housing means for enclosing said double cone elements, said shaft carrier, and elements associated therewith and for containing a lubricant composition therein.

18. The hub according to claim 17, in which said cone driven element comprises said spring bias means at least in part.

19. The hub according to claim 18, in which said second cone applies increasing contact force against said cone driven element as said shaft carrier moves toward said second axial position.

* * * * *